Sept. 19, 1967 W. HOLZER 3,343,118
ELECTRO-MECHANICAL CONNECTIONS
Filed March 9, 1964

INVENTOR:
WALTER HOLZER
By Toulmin & Toulmin
Attorneys 3,343,118
Patented Sept. 19, 1967

3,343,118

ELECTRO-MECHANICAL CONNECTIONS

Walter Holzer, Drosteweg 19, Meersburg (Bodensee), Germany

Filed Mar. 9, 1964, Ser. No. 350,462
Claims priority, application Germany, Mar. 21, 1963, H 48,576
5 Claims. (Cl. 339—17)

Figure 1:
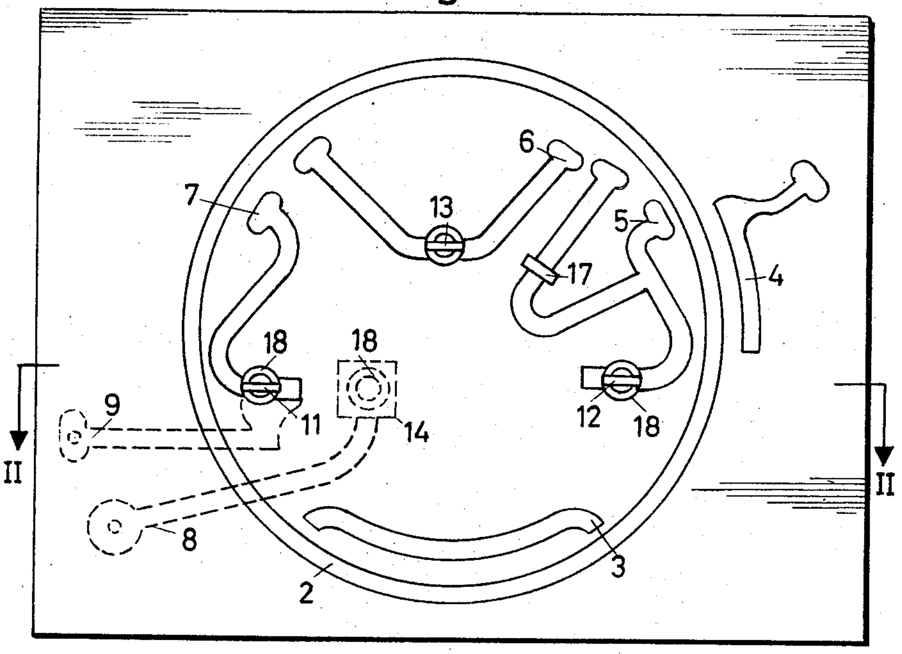

The invention relates to electro-mechanical connections for mechanically and electrically fastening the terminals of control elements conductively to mounting plates having an electric circuit printed on one or both sides.

When transmitters, step switches, control elements and other electrical equipment or devices are to be attached and also electrically connected to mounting plates having circuits printed on them, it is common practice to perforate the plate, pass the terminal plugs or pins of the devices through the perforations and solder them to the printed circuits.

A disadvantage of such connections is that replacement of the soldered devices is complex, particularly if the device in question has a large number of terminals soldered to various conductors of the printed circuit. There is also a possibility of unintentionally tearing individual conductors of the printed circuit off of the mounting plate due to the large amount of heat used during any unsoldering.

Another disadvantage arises in cases where the components are subject to impacts and vibrations. Particularly with heavy devices such as transmitters and step switches the terminal pins and soldered connections are subjected to such high mechanical strain by impact and vibrations that the electrical connections both within the device and between the device and the printed circuit are broken.

The invention has as an object the provision of an improved connection establishing a secure electric contact despite any vibrations and yet readily permitting replacement of the device.

According to the invention, the terminal is equipped with removable, resilient and electrically conductive means for holding it to the mounting plate.

This permits removable attachment of the device to the mounting plate with a certain freedom to vibrate and without requiring soldering to the conductors of the printed circuit, and yet reliable electric contact with the conductors can be achieved.

The terminals may be in the form of flat contacts. Hitherto, it has been usual to make the terminals of electric equipment in the form of pins, with correspondingly low mechanical strength. Flat contacts have far greater mechanical strength. They may extend either at right angles to the mounting plate or parallel thereto. One of the important features is that the flat contacts are in the form of flat elongated tongues which carry an enlargement or shoulder near one end.

The electrically conductive holding means may be helical compression springs, the internal diameter of which is slightly larger than the width of the tongues other than at the enlargements on the latter.

The mounting plate contains slots in which the tongues are mounted for sliding movement and so that they project a considerable distance beyond the side of the plate remote from the device. After pushing the tongues through the slots in the mounting plate, they are not only mechanically attached to the plate by the holding elements but also electrically connected to the various conductors of the printed circuit. For this purpose the compression springs are pushed concentrically onto the tongues and are pre-stressed between the printed sides of the mounting plate and the shoulders or enlargements on the tongues.

In the case of flat contacts arranged parallel to the mounting plate, the compression springs are mounted between the contacts and the printed side of the plate facing the mounted device.

To facilitate insertion of the tongues into the mounting plate and pushing the compression springs onto the tongues, it is advantageous for the free ends of the tongues to be tapered.

In some cases the terminals may need to be connected to additional devices and then the terminals may terminate in soldered and/or screw connections.

Figure 2:
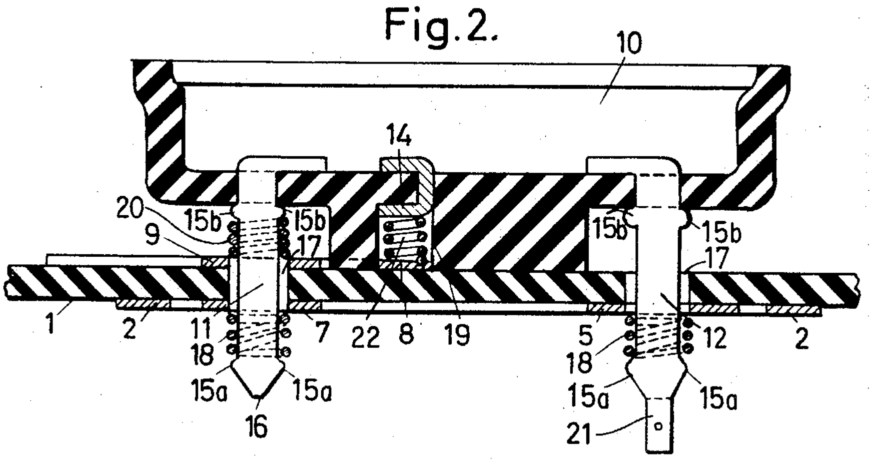

Examples of the invention are illustrated in the accompanying drawings, wherein:

FIG. 1 is a view onto one side of a mounting plate having a switch attached to the reverse side, and FIG. 2 is an enlarged section on the line II—II in FIG. 1.

The mounting plate 1 is of insulating material and carries a printed circuit comprising conductors or tracks 2 to 7 on one side and a printed circuit comprising conductors 8 and 9 on the other side. A step switch 10 (only the base of which is shown) is equipped with terminals in the form of elongated flat tongues 11, 12, 13 extending at right angles to the mounting plate 1 and a flat contact 14 extending parallel to the mounting plate. The contact 14 is to be electrically connected to the conductor 8.

The tongues 11, 12, 13 are equipped with shoulders 15 near their ends and are tapered from the shoulders to the free ends 16 (as illustrated for the tongue 11) or to a lug 21 (as in the case of the tongue 12). The plate 1 contains slots 17 through which the tongues 11, 12 13 are pushed so that they project a considerable distance beyond the side of the plate 1 remote from the switch 10. Removable, resilient and electrically conductive holding means in the form of spiral compression springs 18 have an internal diameter slightly larger than the width of the tongues 11, 12, 13 between the shoulders **15*a* and the mounting plate 1, and are arranged concentrically on the tongues 11, 12, 13 to be pre-stressed between the respective shoulders and the adjacent side of the mounting plate 1. A spiral compression spring 22 is arranged in a recess 19 in the step switch 10 between the conductor 8 and the flat contact 14** and electrically connects same.

It will be seen that the conductors 2 to 9 are intersected by the respective slots 17 at the places where the tongues are to be electrically connected. The step switch 10 can easily be assembled on the plate 1 by pushing the tongues 11, 12, 13 through the corresponding slots 17 and then pushing the compression springs 18 over the tapered ends 16, so that they engage shoulders 15 and press against the corresponding printed conductor. If, as shown in the drawings, the conductor 9 is to be electrically connected to the tongue 11 as well as to the conductor 2, then, prior to inserting the tongue 11 through the plate 1, an additional compression spring 20 is pushed onto the tongue 11 against shoulders **15*b*. When the step switch 10 is to be removed from the plate 1 for replacement, it is necessary only to pull the compression springs 18 off the tongues 11, 12, 13, whereon the switch 10 can be removed from the plate 1** without force or unsoldering.

The drawings show that effective electrical contact is made between the step switch 10 and the printed circuit even if the plate 1 and/or switch 10 are subject to impact or vibrations. If for any reason one of the tongues has to be electrically connected to a further device or to a supply lead, it is possible for the free end of the tongue to be in the form of a soldered, plug or screw contact or lug 21 (see the tongue 12 in FIG. 2), so that an additional electrical connection for the tongue in question may be provided in a simple manner without prejudicing the shock-resistance of the connection and without preventing the device from being replaced if necessary.

It should be noted that the invention is not restricted to the mounting of any particular piece of electrical equipment and is also applicable, for example, to joining transmitters, chokes and relays to printed circuits.

I claim:

1. Connecting means for mechanically and electrically connecting component parts to printed circuits comprising a mounting plate having a printed circuit thereon, and openings therein where component parts are to be connected to the circuit, a component-connecting terminal aligned in a mounted position and projecting through an opening, said terminal being provided with an enlarged portion near the free end thereof, an electrically conductive helical compression spring surrounding the connecting terminal so that the terminal is inside the spiral formed by the spring, one end of the spring engaging the enlarged portion of the connecting terminal, the other end pressing against and being in electrical contact with a portion of the printed circuit, the spring being in a state of compression between the enlarged portion of the connecting terminal and the adjacent side of the printed circuit plate so that the spring holds the connecting terminal in its aligned position, the spring thus providing a mechanical fastening and an electrical conducting terminal connection.

2. The connection means of claim 1 wherein the connecting terminal is in the form of a flat tongue.

3. The connection means of claim 1 wherein the connecting terminal is provided with an end bent at right angle thereto.

4. The connection means of claim 1 wherein the connecting terminal is provided with an enlarged portion and a surrounding spiral spring on the side of the circuit mounting plate not adjacent the helical spring whereby a pair of conducting and simultaneously contained compression springs surround the connecting terminal, each said compression spring being retained on an opposite side of the mounting plate between an enlarged connecting terminal portion and the printed circuit board.

5. The connection means of claim 1 in combination with such component, said component being a switch.

References Cited

UNITED STATES PATENTS

| | | | |
|---|---|---|---|
| 1,454,879 | 5/1923 | Zollinger | 339—253 |
| 2,172,765 | 9/1939 | Kollsman. | |
| 2,592,601 | 4/1952 | Raymond et al. | |
| 2,825,036 | 2/1958 | Sorensen | 339—17 |
| 2,958,065 | 10/1960 | Flanagan | 339—17 |
| 3,001,173 | 9/1961 | Swengel | 339—253 |
| 3,022,483 | 2/1962 | Youger. | |
| 3,149,895 | 9/1964 | Bernstein | 339—17 |
| 3,170,753 | 2/1965 | Witte et al. | 339—17 X |
| 3,206,561 | 9/1965 | Fordeck | 229—17 X |
| 3,209,308 | 9/1965 | Aquillon | 339—17 |

OTHER REFERENCES

Tinnerman: "Electrical Manufacturing," August 1958, page 154.

MARVIN A. CHAMPION, *Primary Examiner.*

ALFRED S. TRASK, *Examiner.*

R. E. MOORE, *Assistant Examiner.*